United States Patent [19]

Hester, Jr. et al.

[11] 3,886,175
[45] May 27, 1975

[54] 9H-DIBENZO(B,F)-S-TRIAZOLO(4,3-D)(1,4)DIAZEPINES

[75] Inventors: Jackson B. Hester, Jr., Galesburg; Jacob Szmuszkovicz, Kalamazoo, both of Mich.

[73] Assignee: The Upjohn Company, Kalamazoo, Mich.

[22] Filed: Feb. 11, 1974

[21] Appl. No.: 441,107

Related U.S. Application Data

[63] Continuation-in-part of Ser. No. 313,208, Dec. 8, 1972, Pat. No. 3,850,942, which is a continuation-in-part of Ser. No. 277,916, Feb. 22, 1972, abandoned.

[52] U.S. Cl........ 260/308 R; 71/92; 260/239 DD; 260/239.3 T; 260/246 B; 260/247.1 E; 260/247.5 D; 260/247.5 EP; 260/268 PC; 260/293.59; 260/293.61; 424/248; 424/269; 424/250; 424/267
[51] Int. Cl.. C07d 57/02; C07d 57/04; C07d 99/02
[58] Field of Search...... 260/308 R, 246 B, 247.1 E, 260/247.5 D, 247.5 EP:268 PC, 293.59, 293.61

[56] References Cited
FOREIGN PATENTS OR APPLICATIONS
2,306,762   8/1973   Germany.......................... 260/308 R Primary Examiner—Alton D. Rollins
Attorney, Agent, or Firm—Hans L. Berenis

[57] ABSTRACT

Compounds of the formula III:

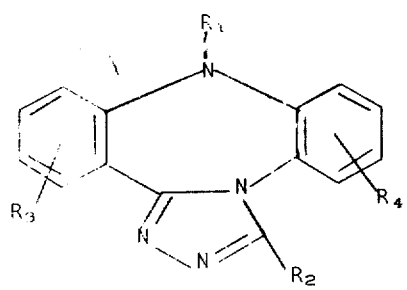

wherein $R_1$ is selected from the group consisting of hydrogen, alkyl of 1 to 3 carbons, inclusive,

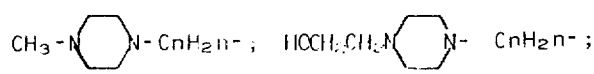

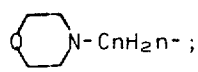

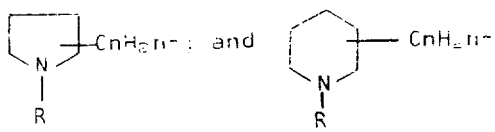

in which $n$ is 1 to 4, inclusive, and R is hydrogen or alkyl defined as above, or $R_1$ is

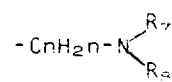

in which $n$ is defined above, $R_7$ and $R_8$ are each selected from the group consisting of hydrogen and alkyl as defined above, or

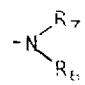

together is pyrrolidino or piperidino; wherein $R_2$ is selected from the group consisting of hydrogen, alkyl, defined as above, hydroxymethyl,

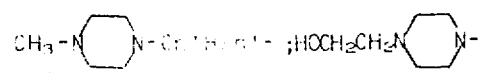

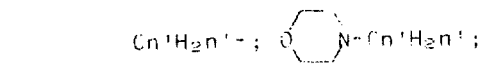

in which $n'$ is 0 to 4, inclusive, and R is hydrogen or alkyl defined as above or $R_2$ is

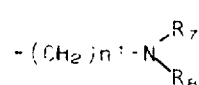

in which $n'$ is defined as above, and $R_7$ and $R_8$ are each selected from the group consisting of hydrogen and alkyl as defined above, or

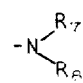

together is pyrrolidino, or piperidino; wherein $R_3$ and $R_4$ are selected from the group consisting of hydrogen, fluoro, chloro, bromo, nitro, alkyl, defined as above, trifluoromethyl, and alkoxy, in which the carbon moiety is of 1 to 3 carbon atoms, inclusive, are prepared by reacting a thio compound of formula 1

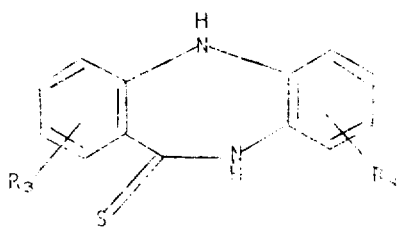

wherein $R_3$ and $R_4$ are defined as above, with formic acid hydrazide or, in two steps, with hydrazine and then triethylorthoformate. The resulting products II can be further modified to yield the other compounds corresponding to formula III, as defined above.

Compounds of formula III and the pharmacologically acceptable acid addition salts and N-oxides thereof have central nervous system antidepressant activity and can be used in mammals and birds.

19 Claims, No Drawings

9H-DIBENZO(B,F)-S-TRIAZOLO(4,3-D)(1,4)DIAZEPINES

CROSS-REFERENCE TO RELATED APPLICATIONS

This application is a continuation-in-part of application Ser. No. 313,208 filed Dec. 8, 1972, now U.S. Pat. No. 3,850,942 which is a continuation-in-part of application Ser. No. 227,916, filed Feb. 22, 1972, now abandoned.

BACKGROUND OF THE INVENTION

Field of the Invention

This invention is directed to new organic compounds and is particularly concerned with novel compounds of formulae II and III and processes for the production thereof.

The novel compounds and the process of production therefore can be illustratively represented as follows:

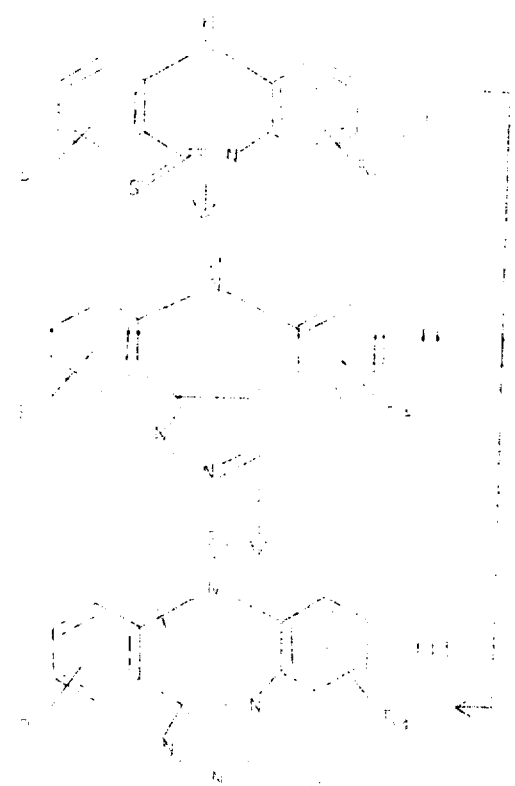

wherein $R_1$ is selected from the group consisting of hydrogen, alkyl of 1 to 3 carbon atoms, inclusive, in which $n$ is 1 to 4, inclusive, and R is hydrogen or alkyl defined as above, or $R_1$ is

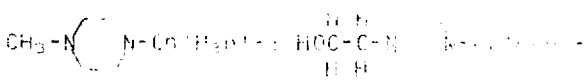

in which $n$ is defined as above, and $R_7$ and $R_8$ are each selected from the group consisting of hydrogen and alkyl as defined above, or

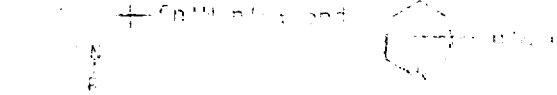

together is pyrrolidino, or piperidino; wherein $R_2$ is selected from the group consisting of hydrogen, hydroxymethyl, alkyl defined as above, in which n' is 0 to 4, inclusive, and R is hydrogen or alkyl defined as above, or $R_2$ is in which n' is defined as above, and $R_7$ and $R_8$ are each selected from the group consisting of hydrogen and alkyl as defined above, or together is pyrrolidino, or piperidino; wherein $R_3$ and $R_4$ are selected from the group consisting of hydrogen, fluoro, chloro, bromo, nitro, alkyl defined as above, trifluoromethyl, and alkoxy, in which the carbon moiety is of 1 to 3 carbon atoms, inclusive.

If $R_2$ of compound III is hydrogen, other $R_2$ substituents are obtained by e.g. halogenation and then reacting the halo compounds with ammonia, substituted amines, cyanides and the like by conventional procedures. Additional methods can be employed to obtain other compounds embraced by this invention and corresponding to formula III:

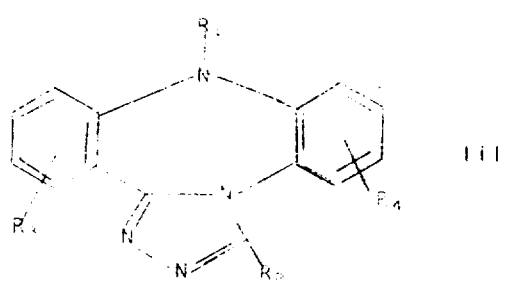

wherein $R_1$ is selected from the group consisting of hydrogen, alkyl of 1 to 3 carbon atoms, inclusive, $$H_3C-N\underset{\phantom{xx}}{\diagup\!\!\!\diagdown}N-C_nH_{2n}-\ ;\quad HOC-C-N\underset{\phantom{xx}}{\diagup\!\!\!\diagdown}N-C_nH_{2n}-\ ;$$

$$\diagup\!\!\!\diagdown N-C_nH_{2n}-\ ;$$

$$\underset{\underset{R}{N}}{\boxed{\phantom{x}}}-C_nH_{2n}-\ ;\quad\text{and}\quad\underset{N}{\boxed{\phantom{x}}}-C_nH_{2n}-\ ;$$

in which $n$ is 1 to 4, inclusive, and R is hydrogen or alkyl defined as above, or $R_1$ is $$-C_nH_{2n}-N\diagdown_{R_8}^{R_7}$$

in which $n$ is defined as above, and $R_7$ and $R_8$ are each selected from the group consisting of hydrogen and alkyl, as defined above, or $$-N\diagdown_{R_8}^{R_7}$$

together is pyrrolidino or piperidino; wherein $R_2$ is selected from the group consisting of hydrogen, hydroxymethyl, alkyl, as defined above, $$CH_3-N\underset{\phantom{xx}}{\diagup\!\!\!\diagdown}N-C_{n'}H_{2n'}-\ ;$$

$$HOC-C-N\underset{\phantom{xx}}{\diagup\!\!\!\diagdown}N-C_{n'}H_{2n'}-\ ;\quad\diagup\!\!\!\diagdown N-C_{n'}H_{2n'}-\ ;$$

$$\underset{\underset{R}{N}}{\boxed{\phantom{x}}}-C_{n'}H_{2n'}-\ ;\quad\text{and}\quad\underset{N}{\boxed{\phantom{x}}}-C_{n'}H_{2n'}-\ ;$$

in which $n'$ is 0 to 4, inclusive, and R is hydrogen or alkyl defined as above, or $R_2$ is $$-C_{n'}H_{2n'}-N\diagdown_{R_8}^{R_7}$$

in which $n'$ is defined as above, and $R_7$ and $R_8$ are each selected from the group consisting of hydrogen and alkyl as defined above, or $$-N\diagdown_{R_8}^{R_7}$$

together is pyrrolidino, or piperidino; wherein $R_3$ and $R_4$ are selected from the group consisting of hydrogen, fluoro, chloro, bromo, nitro, alkyl defined as above, trifluoromethyl, and alkoxy, in which the carbon moiety is of 1 to 3 carbon atoms, inclusive.

The preferred compounds of this invention are those of the formula IIIA:

III A wherein $R'_1$ is selected from the group consisting of hydrogen, methyl, ethyl, $$CH_3-N\underset{\phantom{xx}}{\diagup\!\!\!\diagdown}N-C_{n_o}H_{2n_o}-\ ;\quad\text{and}\quad\underset{\underset{R}{N}}{\boxed{\phantom{x}}}-C_{n_o}H_{2n_o}-\ ;$$

in which $n_o$ is 1 to 3, inclusive, and R is hydrogen, or alkyl of 1 to 3 carbon atoms, inclusive, or $R'_1$ is $$-C_{n_o}H_{2n_o}-N\diagdown_{R_8}^{R_7}$$

in which $n_o$ is defined as above, $R_7$ and $R_8$ are selected from the group consisting of hydrogen and alkyl as defined above, or together is pyrrolidino or piperidino; wherein $R'_2$ is selected from the group consisting of hydrogen, alkyl, as defined above, in which $n_o'$ is 0 to 3, inclusive, and $R_7$ and $R_8$ are each selected from the group consisting of hydrogen and alkyl as defined above, or together is pyrrolidino or piperidino; wherein $R'_3$ and $R'_4$ are selected from the group consisting of hydrogen, fluoro, bromo, chloro, nitro.

The most desirable compounds of formula III are those of the formula IIIB:

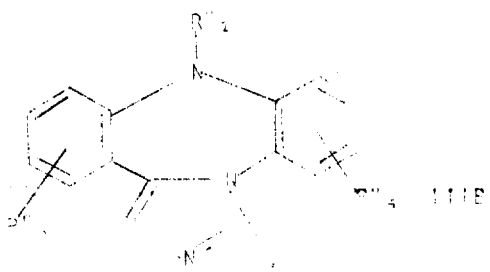

wherein R''₁ is hydrogen, methyl, ethyl, or

in which $n_o$ is 1 to 3, inclusive, and $R_7$ and $R_8$ are hydrogen, methyl or ethyl, or

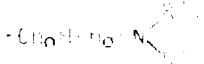

together is pyrrolidino; wherein R''₂ is selected from the group consisting of hydrogen, methyl, ethyl,

in which $n_o$ is defined as above, and R''₇ and R''₈ are each selected from the group consisting of hydrogen, methyl and ethyl; wherein R''₃ and R''₄ are selected from the group consisting of hydrogen, fluoro or chloro.

The invention also embraces the pharmacologically acceptable acid addition salts and N-oxides of the compounds of formula III above.

The process of this invention comprises: heating a thio compound of formula I with formic acid hydrazide or hydrazine and triethylorthoformate to obtain the triazole compound II. Compound III can be obtained by heating a thio compound of formula I with a selected carboxylic acid hydrazide of 2 to 4 carbon atoms, inclusive, or hydrazine and a carboxylic halide of the formula wherein $R_2$ is defined above and X is chloro or bromo.

DESCRIPTION OF THE PREFERRED EMBODIMENT

Lower alkyl groups of 1 to 3 carbon atoms, inclusive, are exemplified by methyl, ethyl, propyl and isopropyl.

The carbon chain moiety of alkoxy is of 1 to 3 carbon atoms, inclusive, and therefore defined as loweralkyl of 1 to 3 carbon atoms, inclusive.

The group $C_nH_{2n}$ wherein $n$ is 1 to 4 comprises $-CH_2-$, $-(CH_2)_2-$, $-(CH_2)_3-$, $-(CH_2)_4-$, and branched alkylene such as:

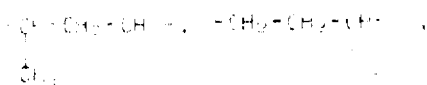

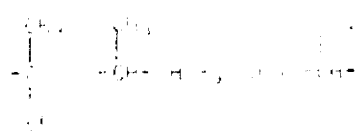

The compounds of formula III and the pharmacologically acceptable acid addition salts are useful central nervous system agents for the control of depression and anxiety in mammals and birds.

For the control of depression the compounds of formula III and the pharmacologically acceptable acid addition salts can be used in unit dosages of 0.1 to 5.0 mg./kg. in oral or injectable preparations to alleviate depression occurring in stressful situations in the same manner as imipramine, amitriptylene and other antidepressants. Such situations are those, for example, when animals are changing ownership or are temporarily put into kennels while their owners are absent from home.

For the control of anxiety the compounds of formula III and the pharmacologically acceptable acid addition salts can be used in unit dosages of 0.1 to 10 mg./kg. in oral and injectable preparations to alleviate tension and anxiety in mammals or birds in the same way as doxepine and other antianxiety agents. Such stressful situations arise, for example, when animals are in travel.

Acid addition salts of the compounds of formula III can be made, such as the fluosilicic acid addition salts which can be applied as mothproofing agents, and salts with trichloroacetic acid, useful as herbicides against Johnson grass, Bermuda grass, yellow and red foxtail, and quack grass.

The pharmaceutical forms of compounds of formula III and salts thereof contemplated by this invention include pharmaceutical compositions suited for oral, parenteral, and rectal use, e.g., tablets, powder packets, cachets, dragees, capsules, solutions, suspension, sterile injectable forms, suppositories, bougies, and the like. Suitable diluents or carriers such as carbohydrates, lactose, proteins, lipids, calcium phosphate, cornstarch, stearic acid, methylcellulose and the like may be used as carriers or for coating purposes. Water or oils such as coconut oil, sesame oil, safflower oil, cottonseed oil, and peanut oil, may be used for preparing solutions or suspensions of the active drug. Sweetening, coloring, and flavoring agents may be added.

For mammals food premixes with starch, oatmeal, dried fishmeat, fishmeal, flour, and the like can be prepared.

The starting materials of this invention dihydrodibenzoazepinethiones I are either known or can be synthesized by known procedures e.g. by refluxing the corresponding amides with phosphorus pentasulfide, as further illustrated in the Preparations.

In carrying out the process of this invention, a selected thione I, is heated with a carboxylic acid hydrazide to about 200° for a period of 30 minutes to 4 hours. Product III which is thus obtained, is isolated and purified by conventional means, e.g. extraction, filtration, chromatography or crystallization.

Alternatively the thione-starting material I can be treated with hydrazine or hydrazine hydrate at temperatures between 25°–100° C. with or without a solvent such as ethanol or other alkanol, ether, tetrahydrofuran, benzene or the like for 1 to 4 hours to give the corresponding intermediate IV:

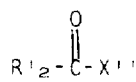

wherein $R_3$ and $R_4$ are defined as above, compound IV can be condensed with an acid halide of the formula $$R'_2-\overset{O}{\underset{}{C}}-X''$$

wherein $R'_2$ is defined as $R_2$ hereinabove, when $n'$ is 1–4, and $X''$ is bromo or chloro to give the corresponding compound of formula III.

If ethyl orthoformate is used, a 3-unsubstituted 9H-dibenzo[c,f]-s-triazolo[4,3-a]diazepine, is obtained which can be brominated and the resulting bromo compound can be used as intermediate for additional 3-substituted compounds of formula III as shown in the Examples.

The following preparations and examples are illustrative of the processes and products of the present invention, but are not to be construed as limiting.

PREPARATION 1

5,10-Dihydro-11H-dibenzo[b,e][1,4]diazepine-11-thione

A mixture of 5,10-dihydro-11H-dibenzo[b,e][1,4]-diazepin-11-one (10 g., 0.0476 mole), phosphorus pentasulfide (9.3 g., 0.0525 mole) and 365 ml. of pyridine was heated at reflux temperature for 3 hours and allowed to stand overnight. The pyridine was evaporated, and the residue was shaken with 250 ml. each of water and chloroform. The resulting suspension was filtered to remove solid product. After filtration the chloroform layer was separated from the aqueous layer, washed with water and saturated salt solution, dried over anhydrous magnesium sulfate and evaporated. The residue was combined with the solid obtained above and crystallized from methanol. Two crops of 5,-10-dihydro-11H-dibenzo[b,e][1,4]diazepin-11-thione were obtained; yield, 9.01 g. (84% of theory), melting point 257°–259° C.

PREPARATION 2

7-Chloro-5,10-dihydro-11H-dibenzo[b,e]-[1,4]diazepine-11-thione

A mixture of 7-chloro-5,10-dihydro-11H-dibenzo[b,e]-[1,4]diazepin-11-one (30.5 g., 0.125 mole), phosphorus pentasulfide (27.8 g., 0.131 mole) and one l. of pyridine was heated at reflux temperature for 4 hours and the pyridine was evaporated in vacuo. The residue was stirred for 1 hour with one l. each of saturated aqueous sodium bicarbonate and methylene chloride and filtered to remove some solid product. The organic layer of the filtrate was washed successively with sodium bicarbonate solution and with saturated salt solution, dried over anhydrous magnesium sulfate and evaporated. The residue was combined with the solid obtained above and triturated with hot chloroform and methanol; 12.2 g. of 7-chloro-5,10-dihydro-11H-dibenzo[b,e][1,4]diazepine-11-thione was obtained of melting point 274°–275° C. Concentration of the chloroform-methanol washings afforded an additional 8.4 g. of product having the same melting point. Recrystallization from dimethylformamide-water gave an analytical sample in the form of pale yellow needles of melting point 276°–277° C.

PREPARATION 3

5,10-Dihydro-5-methyl-11H-dibenzo[b,e]-[1,4]diazepine-11-thione

A mixture of 5,10-dihydro-5-methyl-11H-dibenzo[b,e]-[1,4]diazepin-11-one (6.1 g., 0.0272 mole), phosphorus pentasulfide (6.51 g., 0.0286 mole) and 175 ml. of pyridine was heated at reflux temperature for 3.75 hours and the pyridine was then evaporated in vacuo. The residue was shaken with chloroform and saturated aqueous sodium bicarbonate. The resulting suspension was filtered to give solid A. The chloroform layer of the filtrate was washed successively with saturated aqueous sodium bicarbonate and with saturated salt solution, dried over anhydrous magnesium sulfate, and evaporated. The residue was crystallized from methylene chloride-methanol to give 3.5 g. of 5,10-dihydro-5-methyl-11H-dibenzo[b,e][1,4]diazepin-11-thione; of melting point 217°–218° C., which was unchanged after recrystallization. A second crop weighed 0.8 g. and melted at 214°–215° C. A third crop weighed 0.25 g. and melted at 216°–217°.

Solid A was shaken with methylene chloride and 10% sodium hydroxide and processed as above to give an additional 1.5 g. melting at 216°–217° C.

Anal. calcd. for $C_{14}H_{12}N_2S$: C, 69.96; H, 5.03; N, 11.66; S, 13.34. Found: C, 69.79; H, 5.02; N, 11.37; S, 13.29.

EXAMPLE 1

3-Methyl-9H-dibenzo[b,f]-s-triazolo[4,3-d]-[1,4]diazepine

A mixture of 5,10-dihydro-11H-dibenzo[b,e][1,4]-diazepine-11-thione prepared as described above (4.2 g.; 0.0186 mole) and acethydrazide (13.8 g.; 0.186 mole) was kept in a preheated oil bath for 50 minutes at 200° C. using a take-off condenser. It was cooled, water and chloroform were added and the suspension was filtered; 3.75 g. (81% yield) of 3-methyl-9H-dibenzo[b,f]-s-triazolo[4,3-d][1,4]-diazepine of melting point 330° C. was obtained which did not change on crystallization from tetrahydrofuran.

Anal. calcd. for $C_{15}H_{12}N_4$: C, 72.56; H, 4.87; N, 22.57. Found: C, 72.05; H, 4.66; N, 22.81.

EXAMPLE 2

9H-Dibenzo[b,f]-s-triazolo[4,3-d][1,4]diazepine

In the manner given in Example 1, 5,10-dihydro-11H-dibenzo[b,e][1,4]diazepine-11-thione was condensed at about 200° C. with formic acid hydrazide to give 9H-dibenzo[b,f]-s-triazolo[4,3-d][1,4]diazepine of melting point 283°–285° C.

EXAMPLE 3

6,12-dichloro-9H-dibenzo[b,f]-s-triazolo-[4,3-d][1,4]diazepine

In the manner given in Example 1, 2,8-dichloro-5,10-dihydro-11H-dibenzo[b,e][1,4]diazepine-11-thione was condensed at about 200° C. with formic acid hydrazide to give 6,12-dichloro-9H-dibenzo[b,f]-s-triazolo-[4,3-d][1,4]diazepine.

EXAMPLE 4

7-Chloro-3-methyl-9H-dibenzo[b,f]-s-triazolo-[4,3-d][1,4]diazepine

In the manner given in Example 1, 7-chloro-5,10-dihydro-11H-dibenzo[b,e][1,4]diazepine-11-thione was condensed at 200° C. with acethydrazide to give 7-chloro-3-methyl-9H-dibenzo[b,f]-s-triazolo[4,3-d][1,4]diazepine of melting point 309°–310°.

EXAMPLE 5

3-Methyl-7,11-difluoro-9H-dibenzo[b,f]-s-triazolo[4,3-d][1,4]diazepine

In the manner given in Example 1, 3,7-difluoro-5,10-dihydro-11H-dibenzo[b,e][1,4]diazepine-11-thione was condensed at about 200° C. with acethydrazide to give 3-methyl-7,11-difluoro-9H-dibenzo[b,f]-s-triazolo[4,3-d]-[1,4]diazepine.

EXAMPLE 6

7,10-dinitro-3-[3-(dimethylamino)propyl]-9H-dibenzo[b,f]-s-triazolo[4,3-d][1,4]diazepine In the manner given in Example 1, 4,7-dinitro-5,10-dihydro-11H-dibenzo[b,e][1,4]diazepine-11-thione was condensed at about 200° C. with 4-(dimethylamino)butyric acid hydrazide to give 7,10-dinitro-3-[3-(dimethylamino)propyl]-(9H)-dibenzo[b,f]-s-triazolo[4,3-d][1,4]diazepine.

EXAMPLE 7

9-[3-(Dimethylamino)propyl]-3-methyl-9H-dibenzo[b,f]-s-triazolo[4,3-d][1,4]diazepine Sodium hydride (0.21 g.; 5 moles of 57% dispersion in mineral oil) was added to a solution of 3-methyl-9H-dibenzo[b,f]-s-triazolo[4,3-d][1,4]diazepine (1.24 g.; 5mmoles) in 50 ml. of dimethylformamide, the mixture was stirred at room temperature for 25 minutes and then heated at 95° C. for 25 minutes. After another 15 minutes at room temperature, 3-(dimethylamino)propyl chloride (0.65 g.; 5mmoles in 0.65 g. of xylene) was added and the mixture was heated at 95°C. for 21 hours. It was evaporated and the residue shaken with 25 ml. each of ether and water. The resulting suspension was filtered to give 016 g. of starting compound. The filtrate was separated into layers. The aqueous layer was extracted with methylene chloride (2 × 20 ml.) and the combined organic extract was washed with saturated salt solution, dried over anhydrous magnesium sulfate and evaporated. The residue was triturated with ether to give 0.38 g. of 9-[3-(dimethylamino)propyl]-3-methyl-9H-dibenzo[b,f]-s-triazolo[4,3-d][1,4]diazepine of melting point 165°–167° C., raised to 170.5°–171.5° on recrystallization from ethyl acetate.

Anal. calcd. for $C_{20}H_{23}N_5$: C, 72.04; H, 6.95; N, 21.01. Found: C, 71.82; H, 7.29; N, 21.12.

EXAMPLE 8

9-[2-(dimethylamino)ethyl]-3-methyl-9H-dibenzo[b,f]-s-triazolo[4,3-d][1,4]diazepine In the manner given in Example 7, 3-methyl-9H-dibenzo[b,f]-s-triazolo[4,3-d][1,4]diazepine was first reacted with sodium hydride and then with 2-(dimethylaminoethyl)chloride to give 9-[2-(dimethylamino)ethyl]-3-methyl-9H-dibenzo[b,f]-s-triazolo[4,3-d][1,4]diazepine of melting point 215°–216° C.

EXAMPLE 9

9-[2-(dimethylamino)ethyl]-9H-dibenzo[b,f]-s-triazolo[4,3-d][1,4]diazepine

In the manner given in Example 7, 9H-dibenzo[b,f]-s-triazolo[4,3-d][1,4]diazepine was first reacted with sodium hydride and then with 2-(dimethylamino)ethyl chloride to give 9-[2-(dimethylamino)ethyl]-9H-dibenzo[b,f]-s-triazolo[4,3-d][1,4]diazepine of melting point 137°–138° C.

EXAMPLE 10

9-[3-(dimethylamino)propyl]-9H-dibenzo[b,f]-s-triazolo[4,3-d][1,4]diazepine

In the manner given in Example 7, 9H-dibenzo[b,f]-s-triazolo[4,3-d][1,4]diazepine was first reacted with sodium hydride and then with 3-(dimethylamino)propyl chloride to give 9-[3-(dimethylamino)propyl]-9H-dibenzo[b,f]-s-triazolo[4,3-d][1,4]diazepine of melting point 134.5°–136°.

EXAMPLE 11

7-Chloro-9-[3-(dimethylamino)propyl]-3-methyl-9H-dibenzo[b,f]-s-triazolo[4,3-d][1,4]diazepine In the manner given in Example 7, 7-chloro-3-methyl-9H-dibenzo[b,f]-s-triazolo[4,3-di][1,4]diazepine was first reacted with sodium hydride and then with 3-(dimethylamino)propyl chloride to give 7-chloro-9-[3-(dimethylamino)propyl]-3-methyl-9H-dibenzo[b,f]-s-triazolo[4,3-d]-[1,4]diazepine of melting point 180°–181° C.

EXAMPLE 12

11-Hydrazino-5H-dibenzo[b,e][1,4]diazepine hydrochloride

To a stirred solution of 5,10-dihydro-11H-dibenzo-[b,e][1,4]diazepine-11-thione (42.1 g., 0.0186 mole) in dry methanol (1,500 ml.) was added hydrazine hydrate (37.4 g., 0.743 mole, 100%). A nitrogen bubbler was used to aid in the removal of the hydrogen sulfide formed. The reaction mixture was refluxed via steam bath for 1 ½ hours and concentrated in vacuo. The oil was mixed with water and extracted with benzene. The benzene was washed with water several times, then acidified with aqueous hydrogen chloride. The hydrochloride salt was collected by filtration, washed with benzene and dried to give 37.0 g. (77%), which softens at 135°–140° then completely melts at 251°–254°. The aqueous layer of the filtrate was made basic with aqueus sodium hydroxide and extracted with chloroform. The chloroform was washed with water, dried (sodium sulfate) and concentrated in vacuo. The oil was dissolved in ethyl acetate and acidified with ethanolic hydrogen chloride to give 2.42 g., melting point 250°-254° and 1.31 g., melting point 260°-268° of additional product (overall yield 84%). The analytical sample had a melting point 253°-255°.

Anal. calcd. for $C_{13}H_{13}N_4Cl$: C, 59.88; H, 5.03; N, 21.49; Cl, 13.60. Found: C, 58.02; H, 5.01; N, 21.20; Cl, 13.13.

EXAMPLE 13

11-(1-chloroacetylhydrazin-2-yl)-5H-dibenzo-[b,e][1,4]diazepine hydrochloride

11-Hydrazino-5H-dibenzo[b,e][1,4]diazepine hydrochloride (1.3 g., 0.005 mole) was dissolved in water made basic with sodium hydroxide (aqueous), extracted with chloroform, washed with water, dried over sodium sulfate and concentrated. The oil obtained was dissolved in 15 ml. dry tetrahydrofuran and cooled in an ice bath. Chloroacetyl chloride (0.56, g.; 0.005 mole) was mixed with 5 ml. of tetrahydrofuran and added slowly to the reaction mixture. A gummy solid appeared which formed a precipitate after stirring for one hour. The mixture was cooled and then stirring continued for 2 hours. The reaction flask was filtered, washed with chloroform, and then ether. The solid obtained was dried and used without further purification.

EXAMPLE 14

3-Chloromethyl-9H-dibenzo[b,f]-s-triazolo-[4,3-d][1,4]diazepine 11-(1-chloroacetylhydrazin-2-yl)-5H-dibenzo[b,e]-[1,4]diazepine hydrochloride (1.39 g., 0.004 mole) was mixed with acetic acid and refluxed under nitrogen at 123° in an oil bath. The reaction was stirred for 30 minutes, concentrated in vacuo and then diluted with water. The aqueous solution was neutralized with sodium bicarbonate and extracted with chloroform (precipitate is insoluble in chloroform). Methanol was added and the precipitate went into the chloroform layer. The chloroform-methanol layer was washed with water and then with brine, dried over sodium sulfate and concentrated. The solid was crystallized from chloroform methanol and ethyl acetate to give 0.47 g. of 3-chloromethyl-9H-dibenzo[b,f]-s-triazolo[4,3-d][1,4]diazepine of melting point 280–295°. Further crops of 0.36 g. and 0.105 g. were obtained.

Anal. calcd. for $C_{15}H_{11}N_4Cl$: C, 63.72; H, 3.92; N, 19.82; Cl, 12.54. Found: C, 63.31; H, 3.98; N, 19.67; Cl, 12.72.

EXAMPLE 15

9-[2-(Diethylamino)ethyl]-3-methyl-9H-dibenzo[b,f]-s-triazolo[4,3-d][1,4]diazepine In the manner given in Examplb 7, 3-methyl-9H-dibenzo[b,f]-s-triazolo[4,3-d][1,4]diazepine was reacted with sodium hydride and then with diethylaminoethyl bromide to give 9-[2-(diethylamino)ethyl]-3-methyl-9H-dibenzo[b,f]-s-triazolo[4,3-d][1,4]diazepine.

EXAMPLE 16

6,12-Dichloro-9-[2-(dipropylamino)ethyl]-3-methyl-9H-dibenzo[b,f]-s-triazolo[4,3-a][1,4]diazepine In the manner given in Example 7, 6,12-dichloro-9H-dibenzo[b,f]-s-triazolo[4,3-d][1,4]diazepine was reacted with sodium hydride and then with (2-dipropylaminoethyl)chloride to give 6,12-dichloro-9-[2-(dipropylamino)ethyl]-3-methyl-9H-dibenzo[b,f]-s-triazolo[4,3-d]-[1,4]diazepine

EXAMPLE 17

7,11-Difluoro-9-ethyl-3-methyl-9H-dibenzo-[b,f]-s-triazolo[4,3-d][1,4]diazepine

In the manner given in Example 7,7,11-difluoro-3-methyl-9H-dibenzo[b,f]-s-triazolo[4,3-d][1,4]diazepin was reacted with sodium hydride and then with ethyl iodide to give 7,11-difluoro-9-ethyl-3-methyl-9H-dibenzo[b,f]-s-triazolo[4,3-d][1,4]diazepine.

EXAMPLE 18

7-Chloro-3,9-bis[2-(dimethylamino)ethyl]-9H-dibenzo[b,f]-s-triazolo[4,3-d][1,4]diazepine In the manner given in Example 7, 7-chloro-3-[2-(dimethylamino)ethyl]-9H-dibenzo[b,f]-s-triazolo[4,3-d]-[1,4]diazepine was reacted with sodium hydride and then with 2-(dimethylamino)ethyl bromide to give 7-chloro-3,9-bis[2-(dimethylamino)ethyl]-9H-dibenzo[b,f]-s-triazolo[4,3-d][1,4]diazepine

EXAMPLE 19

3-Bromo-9H-dibenzo[b,f]-s-triazolo[4,3-d]-[1,4]diazepine

A stirred mixture of 9H-dibenzo[b,f]-s-triazolo-[4,3-d][1,4]diazepine, N-bromosuccinimide and carbon tetrachloride was refluxed, under nitrogen for 4 hours cooled and concentrated in vacuo. The residue was mixed with water and extracted with chloroform. The extract was dried over anhydrous potassium carbobonate and concentrated. Crystallization of the residue from ethyl acetate gave 3-bromo-9H-dibenzo-[b,f]-s-triazolo[4,3-d][1,4]diazepine.

EXAMPLE 20

3-diethylamino-9H-dibenzo[b,f]-s-triazolo-[4,3-d][1,4]diazepine

A mixture of 3-bromo-9H-dibenzo[b,f]-s-triazolo-[4,3-d][1,4]diazepine and diethylamine was refluxed for 18 hours and then poured into water. The mixture was made alkaline with sodium bicarbonate and then extracted with chloroform. After evaporation of the chloroform extracts 3-diethylamino-9H-dibenzo[b,f]-s-triazolo[4,3-d]-[1,4]diazepine was obtained which was purified by crystallizations from ethanol-water.

EXAMPLE 21

3-Cyanomethyl-9H-dibenzo[b,f]-s-triazolo-[4,3-d][1,4]diazepine

3-Chloromethyl-9H-dibenzo[b,f]-s-triazolo[4,3-d]-[1,4]diazepine was added, under nitrogen to a stirred solution of sodium cyanide in dry dimethylsulfoxide which had been warmed in a bath maintained at 84° C. After 30 minutes the mixture was cooled, and poured into water; the product was extracted with chloroform. The extract was washed with brine, dried over anhydrous potassium carbonate and concentrated. The residue was crystallized from ethyl acetate-Skellysolve B hexanes to give 3-cyanomethyl-9H-dibenzo[b,f]-s-triazolo[4,3-d]-[1,4]diazepine.

EXAMPLE 22

3-Cyano-9H-dibenzo[b,f]-s-triazolo[4,3-d]-[1,4]diazepine

In the manner given in Example 21, 3-chloro-9H-dibenzo[b,f]-s-triazolo[4,3-d][1,4]diazepine was treated with potassium cyanide to give 3-cyano-9H-dibenzo[b,f]-s-triazolo[4,3-d][1,4]diazepine.

EXAMPLE 23

9H-Dibenzo[b,f]-s-triazolo[4,3-d][1,4]diazepin-3-acetic acid methyl ester

A mixture of 3-cyanomethyl-9H-dibenzo[b,f]-s-triazolo-[4,3-d][1,4]diazepine, methanol and ether was cooled in a salt-ice bath and the reaction mixture saturated with a stream of anhydrous hydrogen chloride during 15 minutes. The mixture was allowed to warm slowly to ambient temperature and stand for 18 hours. It was then poured into water, neutralized with sodium bicarbonate and extracted with chloroform. The extract was washed with brine, dried and concentrated. The residue was crystallized from methanol-ethyl acetate to give 9H-dibenzo[b,f]-s-triazolo-[4,3-d][1,4]diazepin-3-acetic acid methyl ester.

EXAMPLE 24

6,12-Dichloro-3-[1-methylpiperidin-2-yl]-9H-dibenzo[b,f]-s-triazolo[4,3-d][1,4]diazepine In the manner given in Example 1, 2,8-dichloro-5,10-dihydro-11H-dibenzo[b,e][1,4]diazepine-11-thione was condensed with [(1-methyl-2-piperidinyl]formic acid hydrazide at about 200° C. to give 6,12-dichloro-3-[1-methylpiperidin-2-yl]-9H-dibenzo[b,f]-s-triazolo[4,3-d][1,4]diazepine.

EXAMPLE 25

3-[(Dimethylamino)methyl]-9H-dibenzo[b,f]-s-triazolo[4,3-d][1,4]diazepine

To a stirred solution of 3-chloromethyl-9H-dibenzo-[b,f]-s-triazolo[4,3-d][1,4]diazepine (1.41 g., 0.005 mole) in dry tetrahydrofuran (25 ml.) was added potassium iodide (1.66 g.) and dimethylamine (15 ml. of a saturated solution in methanol (under nitrogen). The mixture was stirred at ambient temperature for 2 hours, mixed with water dried over sodium sulfate and concentrated in vacuo. The oil was crystallized from methanol, chloroform-ethyl acetate to give 1.29 g. (89%), melting point 210°–215° of 3-[(dimethylamino)methyl]-9H-dibenzo[b,f]-s-triazolo[4,3-d][1,4]-diazepine. The analytical sample had a melting point of 214°–216°.

Anal. calcd. for $C_{17}H_{17}N_5$: C, 70.08; H, 5.88; N, 24.04. Found: C, 70.40; H, 5.84; N, 24.51.

EXAMPLE 26

3-[(Diethylamino)methyl]-9H-dibenzo[b,f]-s-triazolo[4,3-d][1,4]diazepine

To a stirred solution of 3-chloromethyl-9H-dibenzo-[b,f]-s-triazolo[4,3-d][1,4]diazepine (1.41 g., 0.005 mole) in dry tetrahydrofuran (25 ml.) and methanol (5 ml.) was added potassium iodide (1.66 g.) and diethylamine (5 ml.) under nitrogen. The mixture was stirred at ambient temperature for 2 hours, mixed with water and extracted with chloroform. The chloroform solution was washed with water, dried over sodium sulfate and concentrated in vacuo. The oil was crystallized from methanol-chloroform-ethyl acetate to give 1.35 g. (85%) of 3-[(diethylamino)methyl]-9H-dibenzo[b,f]-s-triazolo[4,3-d][1,4]diazepine of melting point 232°–235°. The analytical sample had a melting point of 232°–235°.

Anal. calcd. for $C_{19}H_{21}N_5$: C, 71.44; H, 6.63; N, 21.93. Found: C, 70.95; H, 6.70; N, 21.51.

EXAMPLE 27

3-(Pyrrolidinomethyl)-9H-dibenzo[b,f]-s-triazolo[4,3-d][1,4]diazepine

To a stirred solution of 3-chloromethyl-9H-dibenzo-[b,f]-s-triazolo[4,3-d][1,4]diazepine (1.41 g., 0.005 mole) in dry tetrahydrofuran (20 ml.) and methanol (5 ml.) was added potassium iodide (1.66 g.) and pyrrolidine (5 ml.) under nitrogen. The mixture was stirred at ambient temperature for 2 hours, mixed with water and extracted with chloroform. The chloroform was washed with water, dried over sodium sulfate and concentrated in vacuo. The oil was crystallized from methanol ethyl acetate to give 1.26 g. (80%), of melting point 100°–107° of 3-(pyrrolidinomethyl)-9H-dibenzo[b,f]-s-triazolo[4,3-d][1,4]diazepine. The analytical sample had a melting point of 100°–107° (foaming).

Anal. calcd. for $C_{19}H_{19}N_5$: C, 71.90; H, 6.03; N, 22.07. Found: C, 71.63; H, 6.26; N, 22.06.

EXAMPLE 28

3-(2-Chloroethyl)-9H-dibenzo[b,f]-s-triazolo-[4,3-d][1,4]diazepine

11-Hydrazino-5H-dibenzo[b,e][1,4]diazepine hydrochloride (13.0 g., 0.05 mole) was dissolved in water, neutralized with aqueous sodium hydroxide and extracted with chloroform. The chloroform was washed with water, dried over sodium sulfate and concentrated in vacuo. The oil was dissolved in dry tetrahydrofuran (200 ml.), under nitrogen and 3-chloropropionyl chloride (6.35 g., 0.05 mole) in tetrahydrofurn (50 ml.) was added slowly to the stirred solution. The reaction mixture was stirred at ambient temperature for 2½ hour. The hydrochloride salt of the adduct was collected by filtration, washed with ether and dried in a vacuum oven (40°) to give 1.431 g.

This hydrochloride salt was combined with glacial acetic acid (150 ml.) and heated, under nitrogen in an oil bath at 120° for 15 minutes. The reaction mixture was cooled and the precipitate collected by filtration and washed with acetic acid. The precipitate was mixed with water and chloroform, neutralized with aqueous sodium hydroxide and recollected by filtration. The chloroform was separated, washed with water, dried over sodium sulfate and concentrated in vacuo. These two residues were recrystallized from methanol chloroform ethyl acetate to give 4.37 g. (37%), melting point 90°–92° of 3-(2-chloroethyl)-9H-dibenzo[b,f]-s-triazolo[4,3-d][1,4]diazepine. The analytical sample had a melting point of 94°–97.5°.

Anal. calcd. for $C_{16}H_{13}N_4Cl$: C, 64.75; H, 4.41; N, 18.88; Cl, 11.95. C, 65.88; H, 4.39; N, 19.90; Cl, 10.49.

EXAMPLE 29

3-[2-(Dimethylamino)ethyl]-9H-dibenzo[b,f]-s-triazolo[4,3-d][1,4]diazepine

To a stirred solution of 3-(2-chloroethyl)-9H-dibenzo-[b,f]-s-triazolo[4,3-d][1,4]diazepine (1.48 g., 0.005 mole) in dry dimethylformamide (25 ml.) was added potassium iodide (1.66 g.) and dimethylamine (4.745 g., in 5 ml. methanol) under nitrogen. The mixture was stirred at ambient temperature for 18 hours, mixed with water and extracted with chloroform. The chloroform was washed with water, dried over sodium sulfate and concentrated in vacuo. The oil was crystallized twice from methanol ethyl acetate to give 0.48 g. of 3-[2-(dimethylamino)-ethyl]-9H-dibenzo[b,f]-s-triazolo[4,3-d][1,4]diazepine, (32%), melting point 161°–165°. The analytical sample had a melting point of 161°–165°.

Anal. calcd. for $C_{18}H_{19}N_5$: C, 70.79; H, 6.27; N, 22.94. Found: C, 70.70; N, 6.33; N, 23.11.

EXAMPLE 30

3-(2-Pyrrolidinoethyl)-9H-dibenzo[b,f]-s-triazolo[4,3-d][1,4]diazepine

To a stirred solution of 3-(2-chloroethyl)-9H-dibenzo[b,f]-s-triazolo[4,3-d][1,4]diazepine (1.48 g., 0.005 mole) in dry dimethylformamide (25 ml.) was added potassium iodide (1.66 g.) and pyrrolidine (5 ml.) under nitrogen. The mixture was stirred at ambient temperature for 18 hours mixed with water, dried over sodium sulfate and concentrated in vacuo. The oil was crystallized twice from methanol ethyl acetate to give 0.71 g. (43%) of 3-(2-pyrrolidinoethyl)-9H-dibenzo[b,f]-s-triazolo[4,3-d][1,4]diazepine of melting point 208°–210°. The analytical sample had a melting point of 208°–210°.

Anal. calcd. for $C_{20}H_{21}N_5$:
C, 72.48; H, 6.39; N, 21.13. Found: C, 72.96; H, 6.55; N, 21.53.

EXAMPLE 31

3-Vinyl-9H-dibenzo[b,f]-s-triazolo[4,3-d]-[1,4]-diazepine.

To a stirred solution of 3-(2-chloroethyl)-9H-dibenzo-[b,f]-s-triazolo[4,3-d][1,4]diazepine (1.26 g., 0.00425 mole) in dry dimethylformamide (25 ml.) was added potassium iodide (1.66 g.) and diethylamine (5 ml.) under nitrogen. The mixture was stirred at ambient temperature for 18 hours, mixed with water and extracted with chloroform. The chloroform was washed with water, dried over sodium sulfate and concentrated in vacuo. The residue was collected, washed with ethyl acetate and recrystallized from methanol-ethyl acetate to give 0.545 g. (38%) of 3-vinyl-9H-dibenzo[b,f]-s-triazolo[4,3-d][1,4]diazepine of melting point >300°. The analytical sample had a melting point of >300°.

Anal. calcd. for $C_{16}H_{12}N_4$: C, 73.82; H, 4.65; N, 21.53. Found: C, 73.40; H, 4.69; N, 20.79.

EXAMPLE 32

3-(3-Chloropropyl)-9H-dibenzo[b,f]-s-triazolo-[4,3-d][1,4]diazepine

11-Hydrazino-5H-dibenzo[b,e][1,4]diazepine hydrochloride (13.08 g., 0.05 mole) was dissolved in water, neutralized with aqueous sodium hydroxide and extracted with chloroform. The chloroform was washed with water, dried over sodium sulfate and concentrated in vacuo. The oil was dissolved in dry tetrahydrofuran (150 ml.) under nitrogen and 4-chlorobutyryl chloride (7.05 g., 0.05 mole) in dry tetrahydrofuran (50 ml.) was slowly added to the stirred solution. The reaction mixture was stirred at ambient temperature for 4 hours. The hydrochloride salt of the adduct was collected by filtration, washed with ether and dried in a vacuum oven (40°) to give 14.123 g.

This hydrochloride salt was combined with glacial acetic acid (100 ml.) and heated under nitrogen in an oil bath at 120° for 15 minutes. The reaction mixture was cooled and the precipitate collected by filtration and washed with acetic acid. The filtrate was concentrated in vacuo, mixed with water, neutralized with aqueous sodium hydroxide and extracted with chloroform. The collected precipitate from above was mixed with water and chloroform, neutralized with aqueous sodium hydroxide and the chloroform separated. The two chloroform solutions were combined, washed with water, dried over sodium sulfate and concentrated in vacuo. The residue was dissolved in methanol-chloroform decolorized with Dorco and crystallized by concentrating and adding ethyl acetate to give 8.76 g. of 3-(3-chloropropyl)-9H-dibenzo[b,f]-s-triazolo[4,3-d][1,4]diazepine of melting point 175°–177° and 2.28 g., melting point 171°–172° (overall yield 92%). The analytical sample had a melting point of 173°–175° C.

Anal. calcd for $C_{17}H_{15}N_4Cl$: C, 65.69; H, 4.86; N, 18.03; Cl, 11.41 Found: C, 65.38; H, 5.00; N, 18.04; Cl, 11.60.

EXAMPLE 33

3-[3-(Dimethylamino)propyl]-9H-dibenzo[b,f]-s-triazolo[4,3-d][1,4]diazepine dihydrochloride To a stirred solution of 3-(3-chloropropyl)-9H-dibenzo[b,f]-s-triazolo[4,3-d][1,4]diazepine (1.55 g., 0.005 mole) in dry dimethylformamide (25 ml.) was added potassium iodide (1.66 g.) and dimethylamine (15 ml. of a saturated methanol solution) under nitrogen. The mixture was stirred at ambient temperature for 40 hours and at 50° for 18 hours to complete the reaction. The mixture was mixed with water and extracted with chloroform. The chloroform was washed with water, dried over sodium sulfate and concentrated in vacuo. The oil was dissolved in ethyl acetate acidified with methanolic hydrogen chloride and recrystallized from methanol ethyl acetate to give 1.74 g. of 3-[3-dimethylamino)propyl]-9H-dibenzo[b,f]-s-triazolo[4,3-d][1,4]diazepine dihydrochloride (94%) of melting point 290°–293°. The analytical sample had a melting point of 291°–296°.

Anal. calcd. for $C_{19}H_{23}N_5Cl_2$: C, 55.13; H, 6.80; N, 18.91; Cl. 19.15. Found: C, 57.47; H, 5.90; N, 17.89; Cl. 17.99.

EXAMPLE 34

3-[3-(diethylamino)propyl]-9H-dibenzo[b,f]-s-triazolo[4,3-d][1,4]diazepine dihydrochloride To a stirred solution of 3-(3-Chloropropyl)-9H-dibenzo[b,f]-s-triazolo[4,3-d][1,4]diazepine (1.55 g., 0.005 mole) in dry dimethylformamide (25 ml.) was added potassium iodide (1.66 g.) and diethylamine (5 ml.) under nitrogen. The mixture was stirred at ambient temperature, mixed with water and extracted with chloroform. The chloroform was washed with water, dried over sodium sulfate and concentrated in vacuo. The oil was dissolved in ethyl acetate, acidified with methanolic hydrogen chloride and recrystallized from methanol-ethyl acetate to give 1.30 g., of 3-[3-(diethylamino)propyl]-9H-dibenzo[b,f]-s-triazolo[4,3-d][1,4]diazepine dihydrochloride of melting point 278°–283° and 0.21 g., of melting point 275°–285° (overall yield 72%). The analytical sample had a melting point of 275°–280°.

Anal. calcd. for $C_{21}H_{27}N_5Cl_2$: C, 59.99; H, 6.47; N, 16.66; Cl, 16.87. Found: C, 59.32; H, 6.37; N, 16.10; Cl, 16.65.

EXAMPLE 35

3-(3-Pyrrolidinopropyl)-9H-dibenzo[b,f]-s-triazolo[4,3-d][1,4]diazepine dihydrochloride To a stirred solution of 3-(3-chloropropyl)-9H-dibenzo[b,f]-s-triazolo[4,3-d][1,4]diazepine (1.55 g., 0.005 mole) in dry dimethylformamide (25 ml.) was added potassium iodide (1.66 g.) and pyrrolidine (5 ml.) under nitrogen. The mixture was stirred at ambient temperature for 40 hr., mixed with water and extracted with chloroform. The chloroform was washed with water, dried over sodium sulfate and concentrated in vacuo. The oil was dissolved in ethyl acetate, acidified with methanolic hydrogen chloride and recrystallized from methanol-ethyl acetate to give 1.65 g. of 3-(3-pyrrolidinopropyl)-9H-dibenzo-[b,f]-s-triazolo[4,3-d][1,4]diazepine dihydrochloride of melting point 285°–290° (overall yield 91%). The analytical sample had a melting point of 295°–300°.

Anal. calcd. for $C_{21}H_{25}N_5Cl_2$: C, 60.28; H, 6.02; N, 16.74; Cl, 16.95. Found: C, 59.80; H, 5.93; N, 17.04; Cl, 16.85.

In the manner illustrated in the preceding examples, other compounds of formula III are obtained, such as:

7,11-difluoro-3,9-bis[(dimethylamino)methyl]-9H-dibenzo-[b,f]-s-triazolo[4,3-d][1,4]diazepine;
6,12-dichloro-3-bromo-9H-dibenzo[b,f]-s-triazolo[4,3-d]-[1,4]diazepine;
6,12-dibromo-3-ethyl-9-[2-(dipropylamino)ethyl]-9H-dibenzo[b,f]-s-triazolo[4,3-d][1,4]diazepine;
6,12-diisopropoxy-3-methyl-9-ethyl-9H-dibenzo[b,f]-s-triazolo[4,3-d][1,4]diazepine;
7,10-dibromo-3,9-dipropyl-9H-dibenzo[b,f]-s-triazolo[4,3-d][1,4]diazepine;
11-trifluoromethyl-7-bromo-3-isopropyl-9H-dibenzo[b,f]-s-triazolo[4,3-d][1,4]diazepine;
13-chloro-3-(2-pyrrolidino)ethyl-9H-dibenzo[b,f]-s-triazolo[4,3-d][1,4]diazepine;
8-fluoro-3-[2-(1-methyl-2-piperidinyl)ethyl]-9H-dibenzo-[b,f]-s-triazolo[4,3-d][1,4]diazepine;
11-isopropyl-3-(3-morpholinopropyl)-9H-dibenzo[b,f]-s-triazolo[4,3-d][1,4]diazepine;
12-chloro-3,9-bis(morpholinomethyl)-9H-dibenzo[b,f]-s-triazolo[4,3-d][1,4]diazepine;
11-bromo-3,9-dimethyl-9H-dibenzo[b,f]-s-triazolo[4,3-d]-1,4]diazepine;
3-hydroxymethyl-9H-dibenzo[b,f]-s-triazolo[4,3-d][1,4]-diazepine;
3-hydroxymethyl-9-[2-(dimethylamino)ethyl]-9-dibenzo-[b,f]-s-triazolo[4,3-d][1,4]diazepine;
3-hydroxymethyl-7-chloro-9H-dibenzo[b,f]-s-triazolo-[4,3-d][1,4]diazepine;
7-chloro-3-[2-(4-ethylpiperazino)ethyl]dibenzo[b,f]-s-triazolo[4,3-d][1,4]diazepine;
3-[2-(4-methylpiperazino)propyl]dibenzo[b,f]-s-triazolo-[4,3-d][1,4]diazepine;

and the like.

Treating the compounds of formulae II or III with a pharmacologically acceptable acid such as hydrochloric, hydrobromic, phosphoric, sulfuric, acetic, propionic, toluenesulfonic, methanesulfonic, tartaric, citric, lactic, malic, maleic, cyclohexanesulfamic and the like produces the pharmacologically acceptable salts of these compounds of formula II or III which can be used like the free base compounds of formula II or III.

Salt formation is achieved in conventional manner by reacting the compounds of formula II or III with excess of a selected acid in a suitable medium e.g. water, a lower alkanol, ether, or acetone and recovering the salt by evaporating the solvent, preferably in vacuo.

The N-oxides are prepared by reacting the compounds of formula II or III with an excess of a peracid such as perbenzoic acid, perphthalic acid, or m-chloroperbenzoic acid, in a solvent such as a lower alkanol, chloroform, or methylene chloride and recovering the N-oxide by evaporating the solvent in vacuo.

We claim:

1. A compound selected from the group consisting of compounds of the formula III

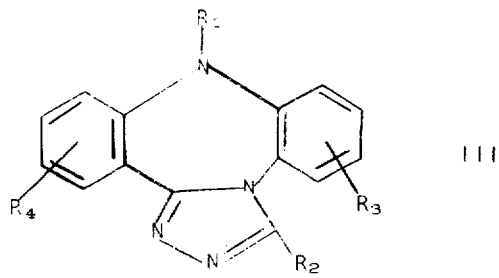

III wherein $R_1$ is selected from the group consisting of hydrogen, alkyl of 1 to 3 carbons, inclusive

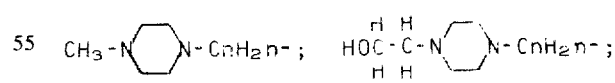

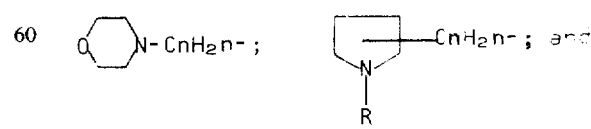

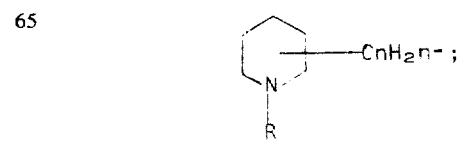

in which n is 1 to 4, inclusive, and R is hydrogen or alkyl defined as above, or $R_1$ is

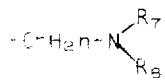

in which n is defined above, $r_7$ and $R_8$ are each selected from the group consisting of hydrogen and alkyl as defined above, or

together is pyrrolidino, or piperidino; wherein $R_2$ is selected from the group consisting of hydrogen, alkyl defined as above, hydroxymethyl,

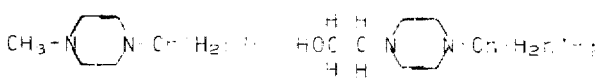

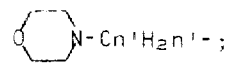

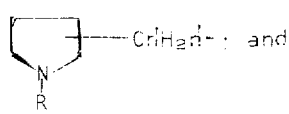

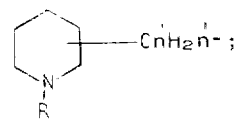

in which n' is 0 to 4, inclusive, and R is hydrogen or alkyl defined as above, or $R_2$ is

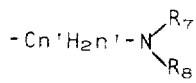

in which n' is defined above, $R_7$ and $R_8$ are each selected from the group consisting of hydrogen and alkyl as defined above, or

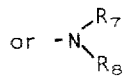

together is pyrrolidino, or piperidino; wherein $R_3$ and $R_4$ are selected from the group consisting of hydrogen, fluoro, chloro, bromo, nitro, alkyl defined as above, trifluoromethyl, and alkoxy, in which the carbon moiety is of 1 to 3 carbon atoms, inclusive, and the pharmacologically acceptable acid addition salts and N-oxides thereof.

2. A compound according to claim 1 of the formula

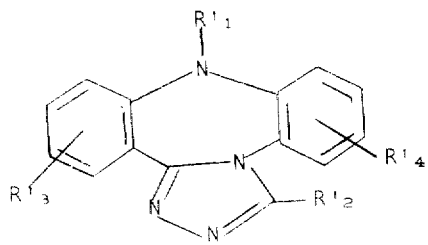

wherein $R'_1$ is selected from the group consisting of hydrogen, methyl, ethyl,

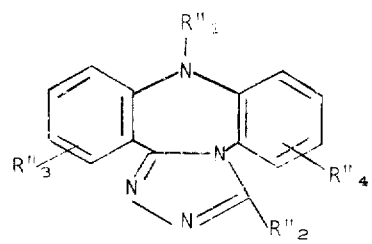

in which $n_o$ is 1 to 3 inclusive; R is hydrogen or alkyl of 1 to 3 carbon atoms, inclusive; or $R'_1$ is

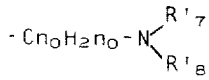

in which $n_o$ is defined as above, $R_7$ and $R_8$ are selected from the group consisting of hydrogen and alkyl as defined above, or, together

is pyrrolidino or piperidino; wherein $R'_2$ is selected from the group consisting of hydrogen, alkyl, as defined above, $$-C_{n_o'}H_{2n_o'}-N\begin{matrix}R_7\\R_8\end{matrix},$$

in which $n_o'$ is 0 to 3, inclusive, and $R_7$ and $R_8$ are each selected from the group consisting of hydrogen and alkyl as defined above, or $$\text{or } -N\begin{matrix}R_7\\R_8\end{matrix}$$

together is pyrrolidino or piperidino; wherein $R'_3$ and $R'_4$ are selected from the group consisting of hydrogen, fluoro, bromo, chloro, nitro, and the pharmacologically acceptable acid addition salts thereof.

3. A compound according to claim 1 of the formula IIIB

[structure IIIB]

wherein $R''_1$ is hydrogen, methyl, ethyl or $$-C_{n_o}H_{2n_o}-N\begin{matrix}R'_7\\R'_8\end{matrix}$$

in which $n_o$ is 1 to 3, inclusive, and $R'_7$ and $R'_8$ are hydrogen, methyl or ethyl, or $$-N\begin{matrix}R'_7\\R'_8\end{matrix}$$

together is pyrrolidino; wherein $R''_2$ is hydrogen, methyl, ethyl,

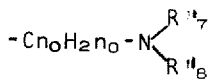

in which $n_0$ is defined as above, and $R''_7$ and $R''_8$ are each selected from the group consisting of hydrogen, methyl and ethyl; wherein $R''_3$ and $R''_4$ are selected from the group consisting of hydrogen, fluoro and chloro, and the pharmacologically acceptable acid addition salts thereof.

4. A compound according to claim 3 wherein $R''_2$ is methyl, $R''_1$, $R''_3$, and $R''_4$ are hydrogen, and the compound therefore is 3-methyl-9H-dibenzo[b,f]-s-triazolo[4,3-d]-[1,4]diazepine.

5. A compound according to claim 3 wherein $R''_1$ is

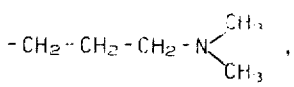

$R''_2$ is methyl, $R''_3$ and $R''_4$ are hydrogen and the compound is therefore 9-[3-(dimethylamino)propyl]-3-methyl-9H-dibenzo[b,f]-s-triazolo[4,3-d][1,4]diazepine.

6. The compound of claim 3, wherein $R''_1$ is (dimethylamino)ethyl, $R''_2$ is methyl, $R''_3$ and $R''_4$ are hydrogen and the compound is therefore 9-[2-(dimethylamino)ethyl]-3-methyl-9H-dibenzo[b,f]-s-triazolo[4,3-d][1,4]diazepine.

7. The compound of claim 3, wherein $R''_1$ is dimethylaminoethyl, $R''_2$, $R''_3$, and $R''_4$ are hydrogen and the compound is therefore 9-[2-(dimethylamino)ethyl]-9H-dibenzo[b,f]-s-triazolo[4,3-d][1,4]diazepine.

8. The compound of claim 3, wherein $R''_1$ is dimethylaminopropyl, $R''_2$, $R_3$, $R''_4$ are hydrogen and the compound is therefore 9-[3-(dimethylamino)propyl]-9H-dibenzo[b,f]-s-triazolo[4,3-d][1,4]diazepine.

9. The compound of claim 3, wherein $R''_1$ is 3-dimethylaminopropyl, $R''_2$ is methyl, $R''_3$ is hydrogen, $R''_4$ is 7-chloro and the compound is therefore 7-chloro-9-3-[(dimethylamino)propyl]-3-methyl-9H-dibenzo[b,f]-s-triazolo[4,3-d][1,4]diazepine.

10. The compound of claim 3, wherein $R''_1$, $R''_2$, $R''_3$, and $R''_4$ are hydrogen and the compound is therefore 9H-dibenzo-[b,f]-s-triazolo[4,3-d][1,4]diazepine.

11. The compound of claim 3, wherein $R''_2$ is methyl, $R''_1$ and $R''_3$ are hydrogen, $R''_4$ is 7-chloro, and the compound is therefore 7-chloro-3-methyl-9H-dibenzo[b,f]-s-triazolo[4,3-d][1,4]diazepine.

12. The compound of claim 3 as dihydrochloride, wherein $R''_2$ is 3-(diethylamino)propyl, $R''_1$, $R''_3$, and $R''_4$ are hydrogen and the compound is therefore 3-[3-(diethylamino)propyl]-9H-dibenzo[b,f]-s-triazolo[4,3-d][1,4]-diazepine dihydro-chloride.

13. 3-(chloromethyl)-9H-dibenzo[b,f]-s-triazolo[4,3-d]-[1,4]diazepine.

14. The compound of claim 3, wherein $R''_2$ is (diethylamino)methyl, $R''_1$, $R''_3$, and $R''_4$ are hydrogen and the compound is therefore 3-[(dimethylamino)methyl]-9H-dibenzo[b,f]-s-triazolo[4,3-d][1,4]diazepin.

15. The compound of claim 3 wherein $R''_2$ is (diethylamino)methyl, $R''_1$, $R''_3$, and $R''_4$ are hydrogen and the compound is therefore 3-[(diethylamino)methyl]-9H-dibenzo-[b,f]-s-triazolo[4,3-d][1,4]diazepine.

16. The compound of claim 2, wherein $R'_2$ is pyrolidino, methyl, $R'_1$, $R'_3$ $R'_4$ are hydrogen and the compound is therefore 3-(pyrrolidinomethyl)-9H-dibenzo[b,f]-s-triazolo[4,3-d][1,4]diazepine.

17. 3-[2-(Chloroethyl)]-9H-dibenzo[b,f]-s-triazolo[4,3-d][1,4]diazepine.

18. The compound of claim 3 wherein $R''_2$ is 2-(dimethylamino)ethyl, $R''_1$, $R''_3$, and $R''_4$ are hydrogen and the compound is therefore 3-[2-(dimethylamino)ethyl]-9H-dibenzo[b,f]-s-triazolo[4,3-d][1,4]diazepine.

19. The compound of claim 2, wherein $R'_2$ is 2-(pyrrolidinyl)ethyl, $R'_1$, $R'_3$, and $R'_4$ are hydrogen and the compound is therefore 3-[2-(pyrrolidinyl)ethyl]-9H-dibenzo[b,f]-s-triazolo[4,3-d][1,4]diazepine.

* * * * *